Figure 1:
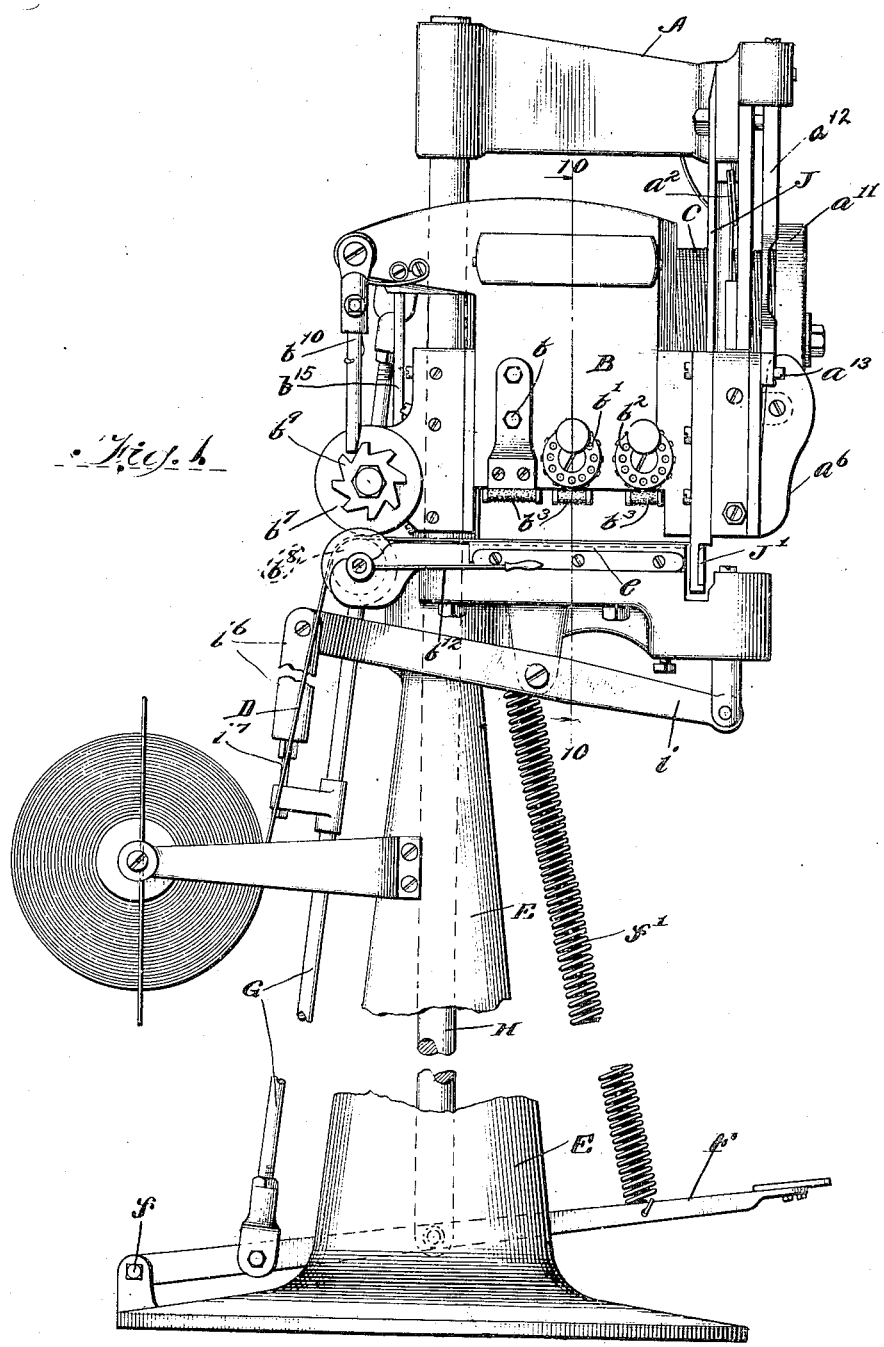

E. CRAIG.
TAG MACHINE.
APPLICATION FILED JAN. 11, 1902.

1,125,969.

Patented Jan. 26, 1915.
10 SHEETS—SHEET 1.

Witnesses:

Inventor:
Edward Craig
by Arthur F. Durand
Atty.

E. CRAIG.
TAG MACHINE.
APPLICATION FILED JAN. 11, 1902.
1,125,969.
Patented Jan. 26, 1915.
10 SHEETS—SHEET 2.
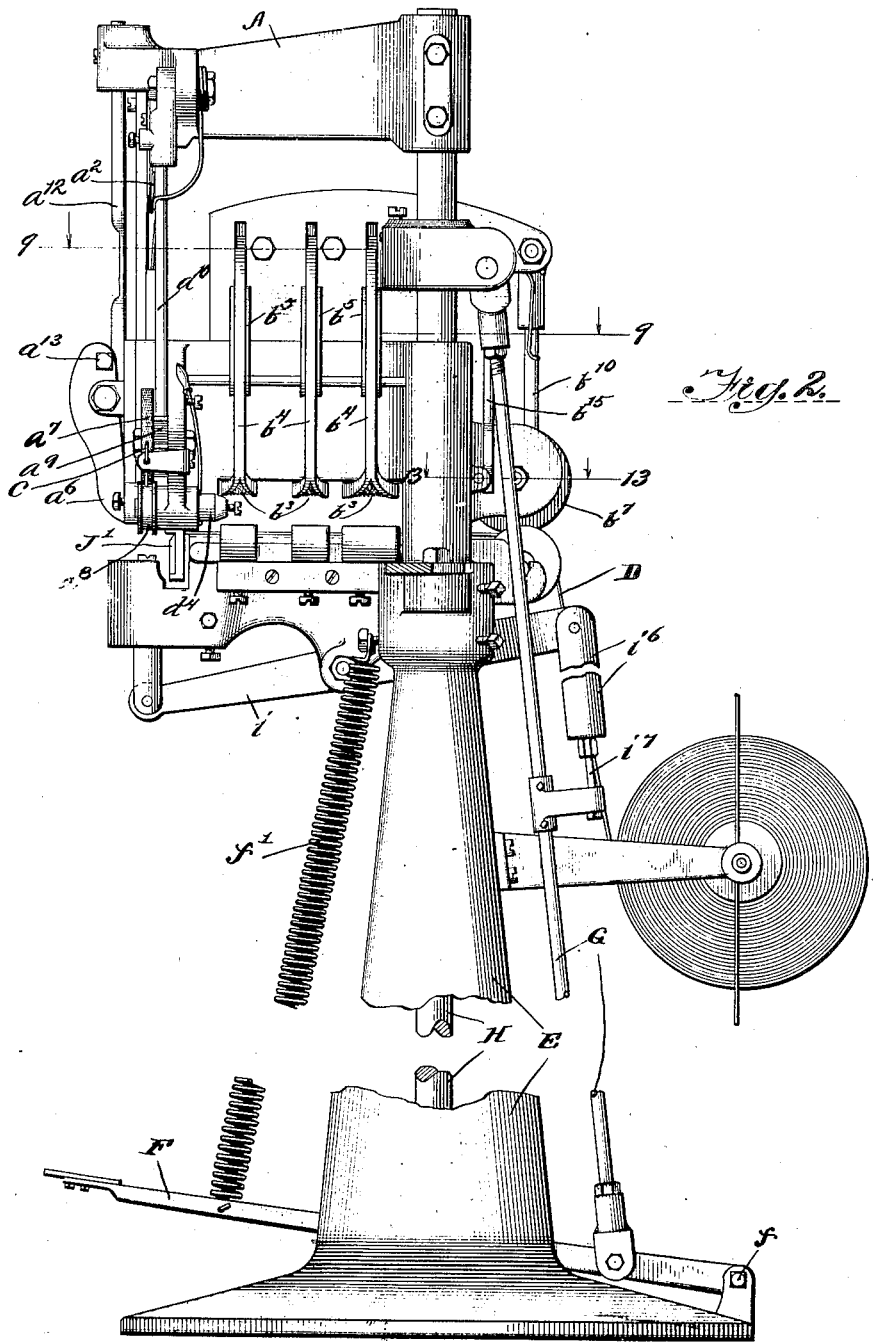

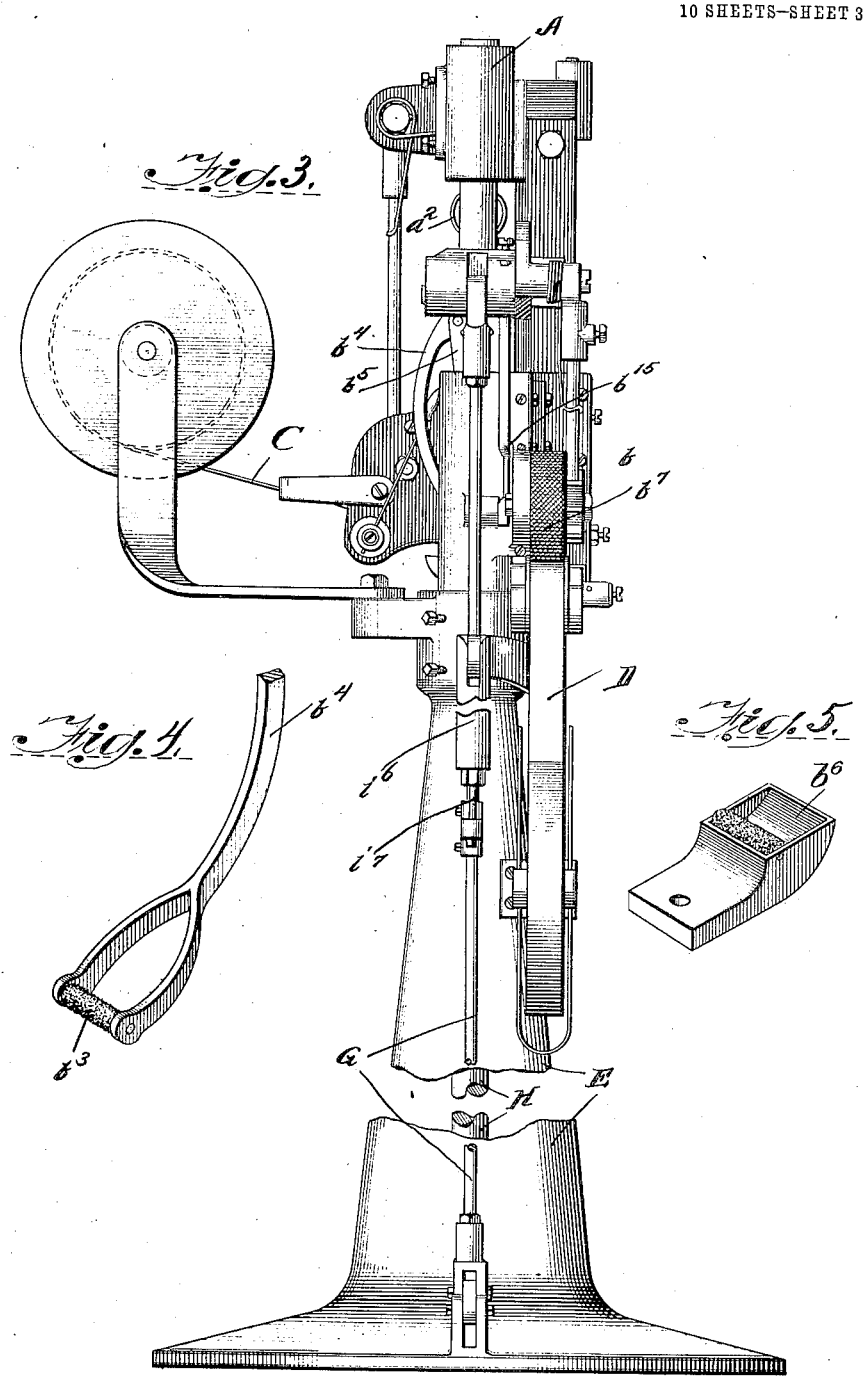

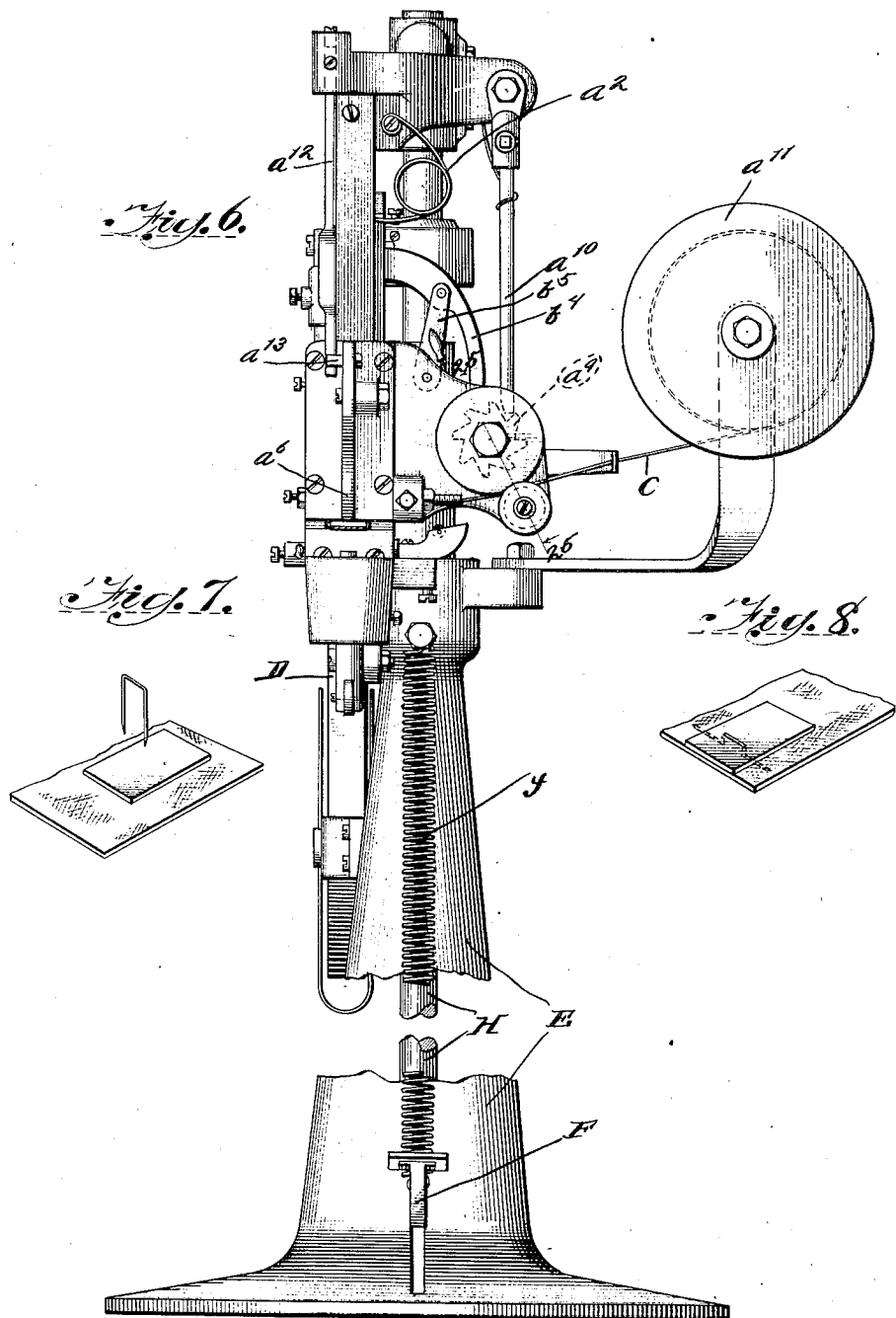

E. CRAIG.
TAG MACHINE.
APPLICATION FILED JAN. 11, 1902.
1,125,969.
Patented Jan. 26, 1915.
10 SHEETS—SHEET 5.
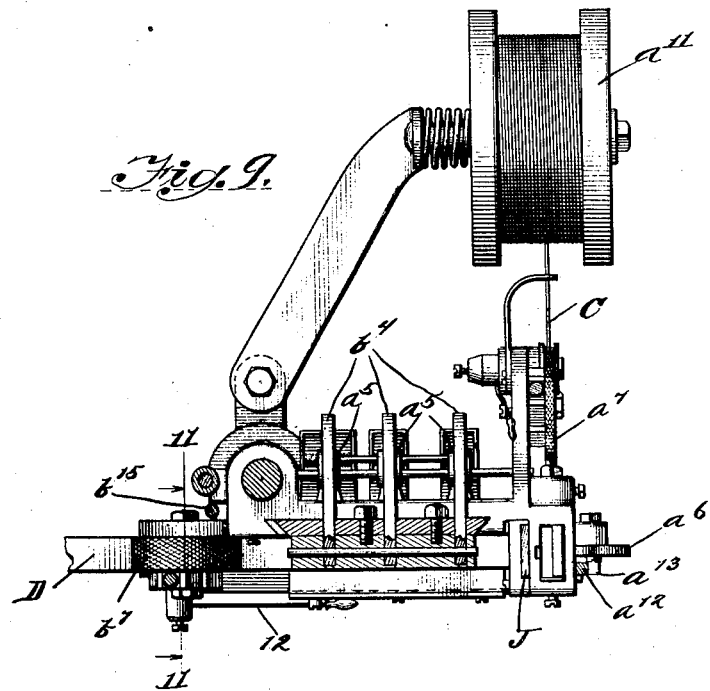
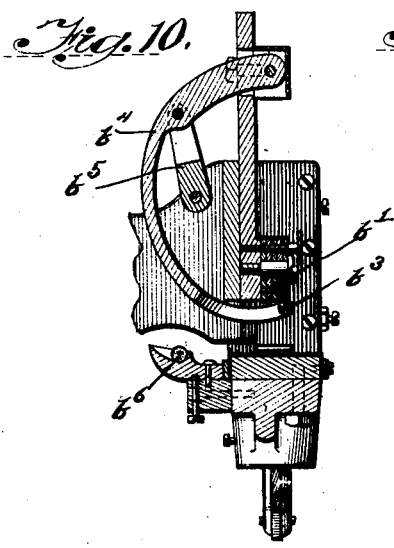
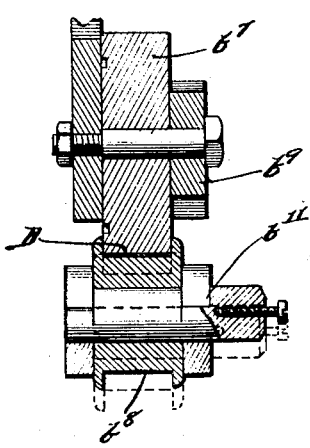
Witnesses:
Ora D. Perry
Harry P. Baumgartner
Inventor:
Edward Craig
by Arthur F. Durand
Atty

E. CRAIG.
TAG MACHINE.
APPLICATION FILED JAN. 11, 1902.

1,125,969.

Patented Jan. 26, 1915.
10 SHEETS—SHEET 6.

Witnesses:

Inventor:
Edward Craig
by Arthur L. Durand
Atty

E. CRAIG.
TAG MACHINE.
APPLICATION FILED JAN. 11, 1902.
1,125,969.
Patented Jan. 26, 1915.
10 SHEETS—SHEET 7.
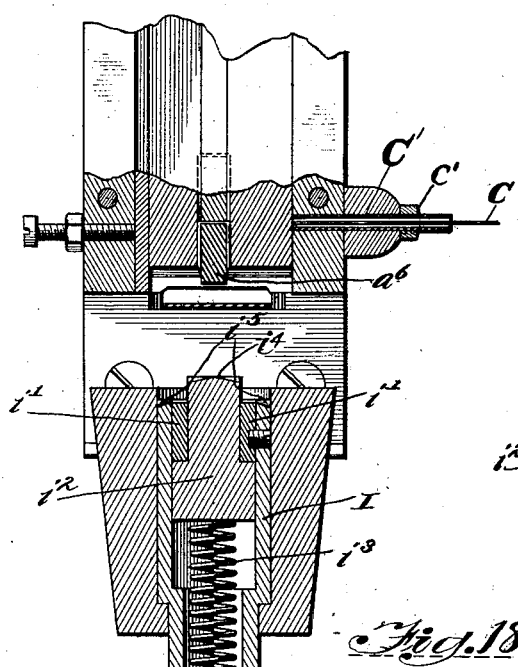
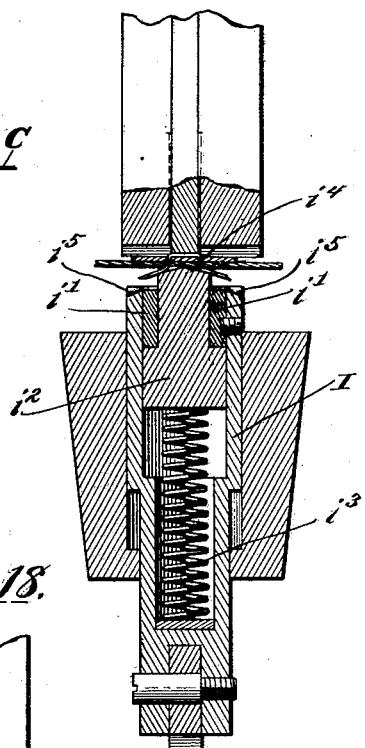
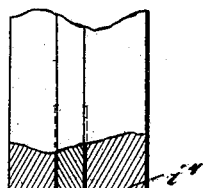
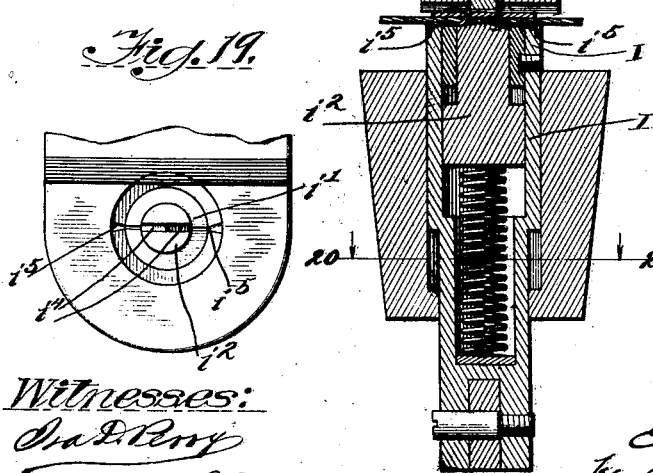
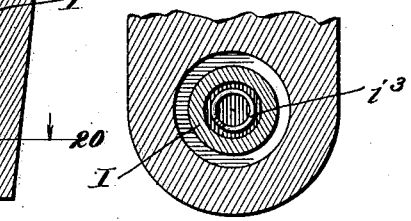
Witnesses:
Inventor:
Edward Craig

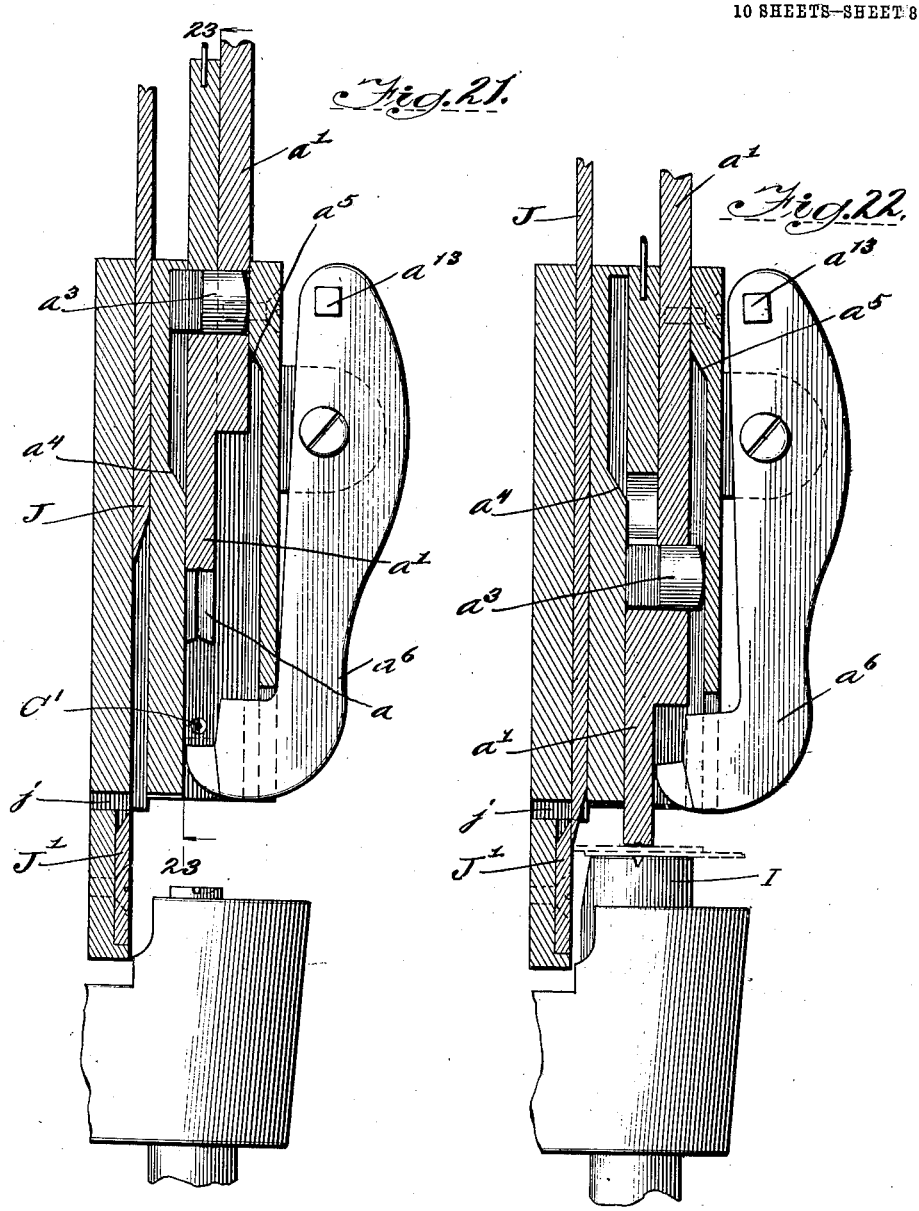

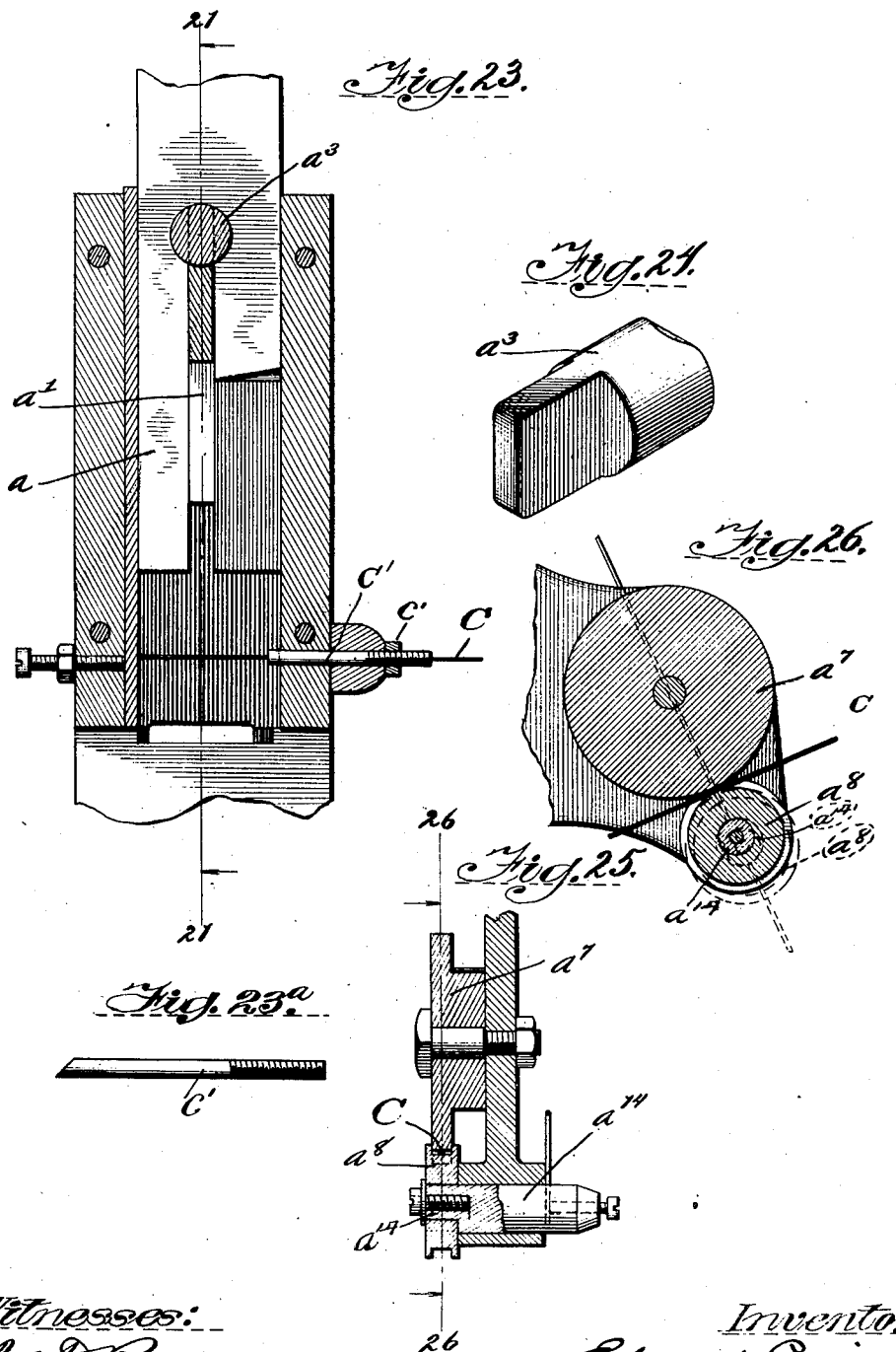

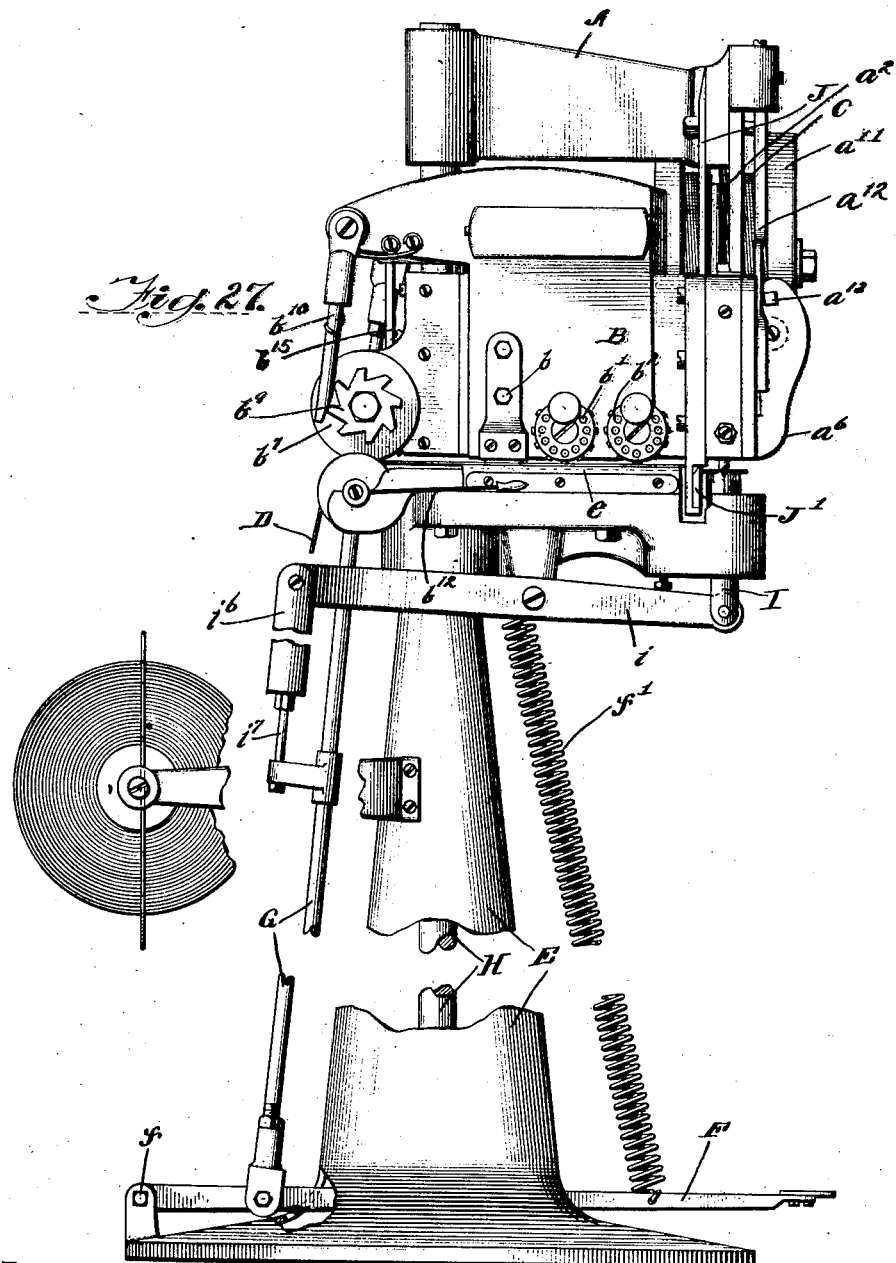

UNITED STATES PATENT OFFICE.

EDWARD CRAIG, OF ST. JOSEPH, MICHIGAN, ASSIGNOR, BY MESNE ASSIGNMENTS, TO SARANAC MACHINE CO., OF ST. JOSEPH, MICHIGAN, A CORPORATION OF MICHIGAN.

TAG-MACHINE.

1,125,969.      Specification of Letters Patent.      Patented Jan. 26, 1915.

Application filed January 11, 1902. Serial No. 89,285.

*To all whom it may concern:*

Be it known that I, EDWARD CRAIG, a citizen of the United States, and resident of St. Joseph, Berrien county, Michigan, have invented certain new and useful Improvements in Tag-Machines, of which the following is a specification.

My invention relates to machines for making and applying tags or pin tickets to cloth or clothing. Machines of this character are usually provided with means for shaping or forming the staples, and also with means for feeding the paper from which the tags or tickets are made. In operation, the portion of the cloth or clothing to which the tag or ticket is to be applied is held in position to receive the points of the staple. When the machine is operated, the staple is first formed and the stapling mechanism then drives the staple through the paper tag or ticket, and also through the cloth or clothing. Simultaneously with the driving of the staple, the tag or ticket is cut from the length of paper, and the stapling mechanism clenches the ends or bends the points of the staple, so as to secure the tag or ticket to the cloth or clothing. The wire for the staples is automatically fed into position, as is also the strip or length of paper for the tags or tickets. In this way, these machines not only make the tags or tickets, but also apply the same to the cloth or clothing.

Generally stated, the object of my invention is to provide certain devices and features of improvement which will tend to increase the general efficiency, and which will tend to render a machine of this character more serviceable and reliable in use.

Certain special objects are to provide a form of clench-block which will effectively turn or bend the staple points, so as to secure the tag or ticket to the cloth or article of wearing apparel.

A further special object is to provide improved means for feeding and marking the paper from which the tags or tickets are formed, and also to provide an arrangement whereby suitable lengths of the paper can be readily cut off and applied by the stapling mechanism to the cloth or garment.

It is also an object of my invention to combine and arrange the stapling, printing, and feeding devices in such manner as to require but one operation for applying the tags or tickets to clothing or other articles.

In addition, it is also an object of my invention to improve the action of the staple forming and driving mechanism, and to arrange this mechanism for effective and satisfactory coöperation with the clench-block and other devices.

The nature and operation of my invention, together with other objects and advantages, will, however, hereinafter more fully appear.

Figure 12:
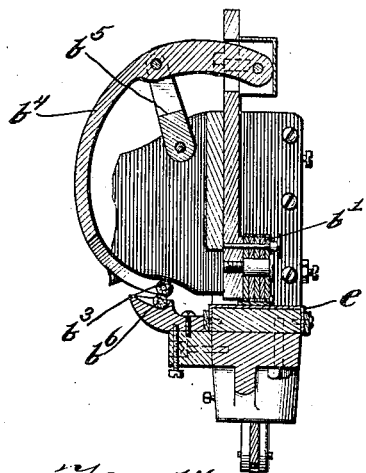
Figure 13:
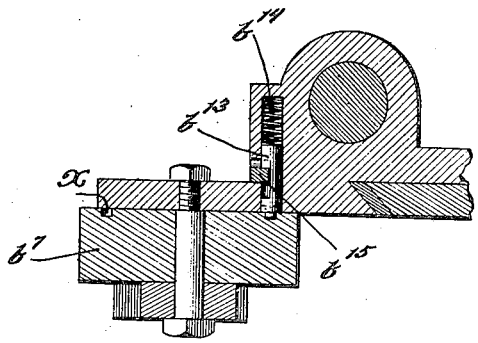
Figure 14:
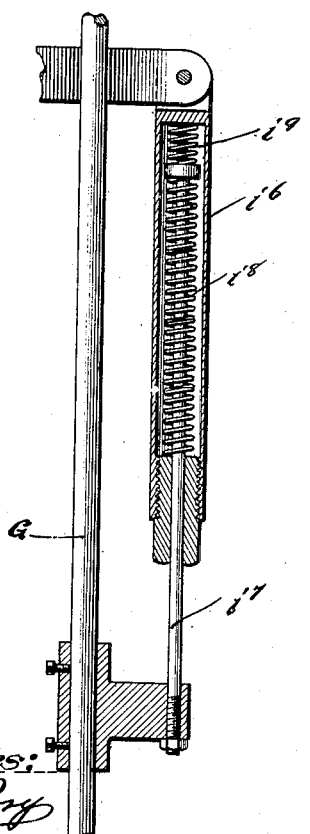
Figure 15:
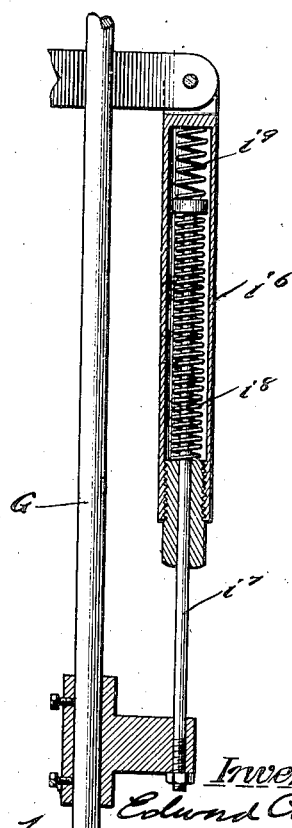

In the accompanying drawings, Figure 1 is a side elevation of a tag machine embodying the principles of my invention. Fig. 2 is a view of the opposite side of the machine shown in Fig. 1. Fig. 3 is a rear elevation of the machine shown in Figs. 1 and 2. Figs. 4 and 5 are perspectives, respectively, of one of the ink rolls and one of the ink wells. Fig. 6 is a front elevation of the machine shown in the preceding figures. Figs. 7 and 8 show the manner in which the staples are driven through the tags and into the cloth or clothing. Fig. 9 is a horizontal section on line 9—9 in Fig. 2. Fig. 10 is a section on line 10—10 in Fig. 1. Fig. 11 is an enlarged section on line 11—11 in Fig. 9. Fig. 12 is a view similar to Fig. 10, but showing the parts in a different position. Fig. 13 is a section on line 13—13 in Fig. 2. Figs. 14 and 15 illustrate different positions of the spring or yielding connection between the clench-block and the rod or connection which connects the foot lever with the printing head. Figs. 16, 17, 18, 19 and 20 are detail views illustrating the construction and operation of the yielding clench-block. Figs. 21 and 22 are sectional views illustrating different positions of the driver, former, and loop-bar composing the stapling mechanism. Fig. 23 is a sectional view showing the front of the lower portion of the driver, and illustrating the manner in which the wire is fed below the staple former. Fig. 23ª shows the beveled cutting block which coöperates with the former in cutting the wire. Fig. 24 is a perspective of the shifting pin or shuttle-like device which automatically connects and disconnects the staple former and driver. Fig. 25 is a detail sectional view on line 25—25 in Fig. 6. Fig. 26 is a section on line 26—26 in Fig. 25. Fig. 27 is a view similar to Fig. 1, but showing both the stapling and the printing heads down, and illustrating the condition of the parts or devices at the moment when the staple is clenched and the tag or ticket applied to the cloth or clothing. With respect to the position and condition of parts, this view corresponds to Figs. 15, 18 and 22. These are the only views in which the parts are shown in position to clench the staple and apply the tag.

As thus illustrated, my invention comprises stapling mechanism operated by a stapling head A, and also printing mechanism operated by a printing-head B. The said stapling mechanism comprises suitable devices for shaping and forming the staples from the wire C, while the printing mechanism comprises suitable devices for placing upon the strip of paper D the desired marks, figures, or letters for the tags. The said heads, it will be observed, are supported in suitably elevated positions upon the upper end of an upright support or standard E. Before the lower portion of this standard, a suitable foot lever F is mounted, and a rod G serves as medium of connection between this lever and the printing-head B, while a similar rod H serves as medium of connection between this lever and the stapling-head A. Thus it will be seen that the stapling mechanism and also the printing mechanism are controlled and operated together from a single foot lever arranged at the base of the machine. For the broader purposes of my invention, the stapling mechanism can be of any suitable form or character. Preferably, however, the stapling mechanism proper comprises a suitable former $a$ and a suitable driver $a'$. The said former is, it will be observed, preferably in the nature of a plate having its lower end bifurcated or provided with prongs. The said driver is arranged for relative and sliding movement in the slot or opening formed by the bifurcation in the lower end of said staple-former. The upper end of the said staple-driver is preferably rigid with the stapling-head A, while the upper end of the former has a yielding connection with said head through the medium of a spring $a^2$. Both the staple-former and the staple driver are provided with transverse openings adapted to receive the shifting pin or shuttle-like device $a^3$. This shuttle-like pin is, it will be observed, provided with a flattened portion adapted to slide down between the prongs of the staple-former. The casing or inclosing structure which forms a guide-way for the staple former and staple driver is constructed with a couple of oppositely arranged bevels or cam surfaces $a^4$ and $a^5$. These oppositely arranged bevels or cam surfaces alternately engage the opposite ends of the shifting pin or shuttle-like device $a^3$, and thereby serve to alternately connect and disconnect the staple former and staple driver. As shown in Fig. 21, the driver and staple former are locked together by reason of the pin $a^3$ being in position to have its round portion extend through both members, but in Fig. 22 the pin or shuttle-like device $a^3$ is shifted so that its round portion only engages the driver, leaving its flattened portion to slide down between the prongs or side portions of the staple-former. The loop-bar $a^6$ is preferably pivoted outside of the structure providing the guide-way for the staple former and driver, and has its lower end hook-shaped, so as to provide a support for the wire while the same is being cut off and bent downward by the lower end portions of the staple former.

In Fig. 23, it will be seen that the wire C is fed directly below the end portions of the staple former, and in position to have a portion of its length cut off and shaped into a staple through the coöperation of the loop-bar and the staple former. The feeding mechanism for the wire preferably consists of the rolls $a^7$ and $a^8$, the upper roll carrying a ratchet $a^9$ which is actuated by a pawl $a^{10}$ carried by the stapling-head A. This will be understood by referring to Fig. 6, and in this figure it will also be understood that the coil of wire is preferably carried by a roll or drum $a^{11}$. In this way, the wire is fed to the stapling mechanism, which latter cuts off a length of wire, forms the same into a staple, and then drives such staple through the tag and into the cloth of the garment or article of wearing apparel.

The loop bar $a^6$ is preferably actuated by a pawl or cam bar $a^{12}$, which is also carried by the stapling-head, and which has its lower end portion provided with a bevel or cam surface adapted to engage the pin $a^{13}$ on the upper end of the loop-bar. Thus the vertical or reciprocating movement of the stapling-head causes the loop-bar to be alternately presented to and withdrawn from the path of the staple former and driver.

The feeding mechanism for the wire, the bevels for operating the shuttle device $a^3$, and also the pawl or bevel rod for operating the loop-bar, are all arranged and timed to properly coöperate in cutting off the wire, bending the same into a staple, and driving the same through a tag and the cloth of the garment. The spring $a^2$ allows the staple former to remain stationary while the staple driver continues its downward movement. When the stapling-head starts upward, the staple former remains in its depressed position until the driver carries the shuttle-pin $a^3$ into position to be forced through the round opening in the staple former. The two members, that is to say, the staple former and the staple driver, then continue their upward movement together.

Referring to Figs. 26 and 25 it will be seen that a cam-pin $a^{14}$ is provided for tightening the wire feed, so as to insure the proper feeding movement of the same.

The clench-block, by which the points of the staples are clenched, and which coöperates with the stapling mechanism in applying the tags to the cloth or clothing, consists of the tubular member I, which, it will be observed, is carried in a vertical opening or socket formed in the upper portion or top of the support upon which the various devices are mounted. This tubular member is preferably pivoted at its lower end to a lever arm $i$. This lever arm, it will be observed, is pivoted to the support or standard at a point near its center, and is adapted for throwing the tubular member I up and down in its socket or guide-way. Within the upper end of said tubular member, is preferably a collar or ring $i'$, adapted to afford a shoulder for the clench-block $i^2$. This clench-block, it will be observed, is enlarged at its lower end, so as to fit the bore of the tubular member I. A spring $i^3$ is preferably interposed between the bottom of the clench-block and the bottom of the opening in the tubular member I. This spring, it will be seen, normally holds the clench-block $i^2$ up against the shoulder provided by the ring $i'$. The upper end of the clench-block $i^2$ is preferably provided with downwardly inclined grooves $i^4$, adapted to receive the ends of the staple. The upper end of the tubular member I, and also the top of the ring $i'$, are likewise provided with grooves $i^5$, arranged to register with the grooves in the upper edge of the clench-block. Thus constructed, the clench-block is carried up and down by the tubular member I, and is also capable of a movement up and down relatively to said tubular member. When the staple is driven through the tag and clothing, the staple pins first strike the inclined grooves in the top of the clench-block, and the staple driver, continuing its downward movement, the clench-block is forced down until the staple points strike the grooves in the upper end of the ring $i'$ and tubular member I. This final action causes the staple points to be bent outward and in a flatwise condition, as shown in Fig. 8. The initial deflecting or clenching of the staple is, of course, effected by the upper end of the clench-block $i^2$, while the final clenching or bending is due to the upward pressure of the tubular member I. As stated, the rod G forms a medium of connection between the foot lever and the printing-head B, and this rod also serves as a medium of connection between the foot lever and the lever $i$. This latter connection is preferably in the nature of a spring or yielding connection, so that when the foot lever is depressed, the clench-block moves upward and is yieldingly pressed against the underside of the cloth or garment to which the tag is to be applied. For example, the rod G can be connected with the rear end of the lever $i$ by means of the tube $i^6$ and the rod $i^7$, the tube being held against relative longitudinal shift or sliding movement by a spring $i^8$. This spring, it will be seen, is inclosed by the tube $i^6$, and provides yielding connection between the foot lever and the clench-block. It will also be seen that a relatively small spring $i^9$ is interposed between the top of the rod $i^7$ and the upper end of the tube $i^6$. With the clench-block thus operated and yieldingly presented to the cloth, it not only serves as a means for clenching the staples, but it also operates as a pressure foot or holding device for holding the cloth or garment and also the paper tag in position to receive the staple. With the provision of the two springs $i^8$ and $i^9$, the foot lever continues to move downward for a short distance after the clench-block ceases its upward movement, and also the said lever then moves upward for a short distance before the clench-block moves downward and away from the stapling mechanism. With the provision of the spring $i^9$, the foot lever and rod G can move upward after the lever $i$ reaches the limit of its downward movement. Also, as it is yieldingly presented, the member $i$ can move down under the pressure of the staple driver. In this way, the tag is securely clamped between the driver and former on the top and the clench-block device below, while it is being cut off and stapled on to the cloth.

The printing mechanism for placing the marks or figures upon the paper is, as stated, carried by and operated by the printing-head B, which is reciprocated up and down by the lever F through the medium of the said rod G. It will be understood that in a machine of this character, it is desirable to have the tags or tickets which are to be applied to the cloth or clothing provided with suitable marks, spaces or figures. It will also be understood that it is desirable to have the printing mechanism of such character that it can be readily altered in accordance with the character of tag desired. For the broader purposes of my invention, this printing mechanism, and also the mechanism for feeding the paper, can be of any suitable or approved form. As a simple and effective arrangement, however, the type or devices for placing the imprints upon the paper, consist of the type-holder $b$ and of the two rotary type carrying plates $b'$, $b^2$. These are arranged, it will be observed, so that the type contained by the holder operate first to place certain marks or configurations upon the paper, and when the paper moves along for a short distance, the type wheels or plates $b'$ then add certain letters or figures to the marks or configurations placed upon the paper by the type in the holder $b$, and the further movement of the paper then brings the printed portion of the paper below the type wheels or plate $b^2$, which latter then add certain desired figures or letters or marks to the configurations or marks already on the paper. It will be observed, however, that the three devices, that is to say, the type or printing devices $b$, $b'$, $b^2$, operate simultaneously, and that by the time the first tag has been printed, a second tag is nearly printed, and that a third tag has just been started by the type in the holder $b$. In other words, at the end of the first feeding movement of the paper, one tag is partially printed and another is just started by the type in the holder $b$, and when the paper is moved or fed forward for the second time, the first tag is fully printed, the second one is two-thirds printed, and the third tag only partially printed. It will be readily understood that these type carrying or printing devices can be of any suitable form or character. Each printing device is, however, as stated, mounted upon the vertically reciprocating printing head B. These type carrying printing devices are preferably inked by the rolls $b^3$ carried at the lower ends of the arms $b^4$. These arms are preferably pivoted at their upper ends to the printing head B, and are curved so as to permit them to carry the inking rolls $b^3$ below the head and into engagement with the undersides or bottoms of the printing devices $b$, $b'$, $b^2$. In order to give these arms which carry the inking rolls the proper movement, the swinging arms $b^5$ are provided and arranged to connect a stationary portion of the machine with the upper end portions of the said arms $b^4$. These pivoted arms $b^5$ provide fulcrum points for the arms $b^4$, and when the printing head moves up and down, these arms $b^4$ are tilted upon their fulcrums in such manner as to cause the printing rolls $b^3$ to alternately engage the printing devices and withdraw from the path of the printing-head. The ink wells $b^6$ are, it will be observed, preferably arranged in such position that when thrown out from under the printing-head the inking rolls $b^5$ take up ink, and in this way prepare for the next operation. These ink wells can be of any suitable form or character, and can be secured in any suitable way to the frame or body of the machine.

The mechanism for intermittently feeding the paper forward, so as to permit the same to be printed and cut off in suitable lengths, consists, preferably, of the feed rolls $b^7$ and $b^8$, arranged at the back of the machine, and adapted to draw the strip of paper between them and feed the same forward into position to be printed. The upper roll $b^7$ preferably carries a ratchet wheel $b^9$, which is actuated by a pawl $b^{10}$ carried by the printing head B. In Fig. 11, it will be seen that the lower roll is preferably provided with flanges to properly guide the paper, and that this roll is mounted upon an eccentric pin $b^{11}$. This pin is adapted to be partially rotated for the purpose of increasing or decreasing the pressure between the two rolls, so as to insure the proper feeding action of the paper. A small lever $b^{12}$ projects from the end of this pin and serves as means for adjusting the parts and thereby regulating the pressure of the rolls and insuring the proper feeding action of the paper. It will be understood that it is desirable to have the paper feed forward and to then instantly stop, and be held firmly in place while the printing devices are operated. For this purpose the locking pin $b^{13}$ is provided and adapted to automatically engage and release the feeding roll $b^7$. This pin, it will be observed, is held in engagement with the printing roll by a spring $b^{14}$. A pawl or cam rod $b^{15}$ is provided and arranged to engage a notch in this pin. This pawl or cam rod $b^{15}$ is carried by the printing-head B, and has a beveled or reduced portion, as shown in Fig. 3, adapted to cause a sliding or reciprocating movement on the part of the pin $b^{13}$. The pawl or cam rod $b^{15}$ withdraws the pin and releases the feed roll at a time when it is desired to feed the paper, but releases the pin and allows it to lock the roll as soon as the paper is in position to receive the pressure of the printing devices. In this way, the paper is intermittently fed beneath the printing devices, and when the paper is not moved it is held firmly in place by the feeding rolls, owing to the locking of the upper roll by the said locking pin $b^{15}$. It will, of course, be understood that suitable lengths of the paper are cut off as fast as the same is fed or moved along, and that the operations of the various parts or devices can be so timed that the staple will be driven and the paper cut off substantially at the same, or nearly at the same time. The knife J for cutting off the paper is preferably carried by the stapling-head A, and preferably extends downwardly through the casing or body structure inclosing the staple former and driver. The lower end of this knife is preferably sharpened, as shown in Figs. 21 and 22, and the coöperating knife J' is preferably mounted upon a stationary portion of the machine and arranged in position to have its upper edge oppose the lower edge of the upper knife J. By referring to said Figs. 21 and 22, and also to Figs. 1 and 27, it will be seen that this cutting device is arranged immediately back of the clench-block and in such position that the paper is fed through and cut off, preferably at the time when the ends or points of the staple are completely clenched. The paper, while feeding forward, moves or slides through the feed opening $j$ and across the upper edge of the lower knife J'. In this way, it is presented in position to not only receive the staple, but also in position to be cut off by the coöperating action of the two knives. At this juncture, it will also be observed that another cutting device is provided by the lower end of the staple former, which fits tightly within its guide-way, and which cuts off the projecting portion of the wire as it slides or moves downwardly. The cutting off of the wire occurs first, and as the staple is carried downward and pressed through the paper and cloth, its points or ends are clenched, and at this time the paper knives operate to cut off the projecting end portion of the paper which then remains attached to the cloth or clothing, in the form of a tag or ticket. In this connection, it will be readily understood that the knives for cutting the paper can be of any suitable relative formation, so as to give the tags any suitable formation. In the drawings, the knives are straight, and it will therefore be seen that the tags will be either square or oblong when applied to the cloth or clothing. As stated, however, the knives can be given any suitable shape or formation, so as to give the tags any desired shape or contour.

With respect to the general operation of the machine, it will be seen that the rod G is attached to the lever F at a point much nearer the latter's fulcrum than the lower end of the rod H, and that for this reason the stapling-head A moves much faster than the printing-head B. The position and character of the stapling mechanism make it desirable to provide for a relative movement between the two heads A and B, inasmuch as the staple former and driver have a greater distance to travel than the printing devices. Normally the foot lever F is held up by the spring $f'$. When depressed, this foot lever causes both the heads A and B to move downward, thereby feeding the wire and operating the stapling mechanism, and also printing or placing certain marks or configurations upon the portions of the paper held beneath the printing devices. At this juncture, it will be observed that a straightened portion of the paper strip is held by a base or supporting guideway $e$, formed at the upper portion of the standard or body of the machine. Before the lever is depressed, the cloth or article of wearing apparel is, of course, inserted between the clench-block and the stapling mechanism, and when the foot lever is then depressed the clench-block moves upward and holds the cloth in place, and in position to receive the staple. The downward movement of the stapling-head causes the staple former to move downward and cut off the wire fed into place, and, the downward movement continuing, the staple is then bent or formed upon the projecting end of the loop-bar $a^6$. The pawl which actuates this loop-bar then causes the latter to withdraw from the path of the staple former and driver, and the staple is carried downward and the lower end of the staple former brought into engagement with the upper surface of the paper. The shuttle-pin $a^3$ is then actuated to release the staple former, and the staple driver then continues its downward movement independently of the staple former, and, in this way, the staple is driven through the paper and cloth against the upper end of the clench-block. The points or ends of the staple are then clenched or bent outwardly in a flatwise manner, as previously described, and as shown in Fig. 8. The downward movement of the head B, as previously explained, causes the desired printing action—that is to say, the printing devices move downward and bear against the upper surface of the paper which rests upon the support or guide-way $e$. The foot lever F is then released, and both heads travel upward, so as to disengage the paper and allow the tag to remain secured in place upon the cloth or clothing. This upward movement of the head B operates to withdraw the inking rolls carried by the arms $b^4$, and to bring the said rolls into engagement with the type or printing devices. In this way, the upward movement of the two heads brings the devices into position to make the next tag and to drive the next staple. In other words, when the two heads have moved upward to the limit of their stroke, the printing devices are in readiness for the next downward movement, and the stapling mechanism is in condition to form and drive the next staple. Thus it requires but a single operation to make and apply each tag or ticket. Each time the foot lever is depressed, a tag or ticket is completed, and at the same time such tag or ticket is applied to the cloth or clothing. The clench-block, it will be observed, bends or deflects the staple points in an effective manner. the points or ends being deflected or bent outward and then pressed flat. The points of the staple are not clenched or bent into the cloth. As a matter of further and special improvement, the cutting block C' is preferably tubular and provided with a beveled end which coöperates with the beveled portion of the former in cutting the wire. This block is preferably tubular and adjustable, and is provided with a threaded portion having a lock-nut $c'$. In this way, the block can be properly adjusted and locked. The beveling provides the staples with beveled points.

It will be seen that means are provided, such as the rod H and the relative arrangement of the paper-cutting knife and the staple driver, for timing the cutting of the paper ahead of the final clenching or outward flattening of the staple points, as described. It will also be seen that means are provided, such as the rod G and the lever *i*, for timing the upward movement of the yielding clench-block ahead of the cutting of the paper, substantially as described.

What I claim as my invention is—

1. A machine for making and applying tags, comprising a reciprocating stapler-head, a printing-head, a single foot-lever for reciprocating both of said heads, a rod or connection for connecting the printing-head with the foot-lever at a point near the latter's fulcrum, connection between the said stapling-head and said foot-lever, said latter connection engaging said foot-lever at a point farther away from said fulcrum, the stapling head thereby having a greater extent of movement than the printing-head, a feeding device for automatically feeding the wire, a cutting device for automatically cutting the paper, and a clench-block, the said machine as a whole comprising suitable connections and relative arrangement whereby the means for feeding the paper, the means for printing on the paper, the means for cutting the paper, the means for driving and clenching the staples, and the loop-bar upon which the staples are formed, are all arranged in a row or series along the path of travel of the strip of paper, in the order mentioned, and whereby the several steps involved in the general operation of making and applying the tags are all performed in their proper order or sequence.

2. A machine for making and applying tags, comprising a suitable standard, a rod or spindle extending downward through said standard, a head carried at the upper end of said rod or spindle, staple-forming-and-driving mechanism carried by said head, a printing-head supported for vertical reciprocation at the upper portion of said standard, a foot-lever having its end fulcrumed at the base of said standard, a rod connecting said printing-head with said foot-lever at a point near the latter's fulcrum, and the said stapling-point thereby having a greater extent of movement than the said printing-head, and automatic means for feeding and cutting the paper, and the said machine as a whole comprising suitable connections and relative arrangement whereby the means for feeding the paper, the means for printing on the paper, the means for cutting the paper, the means for driving and clenching the staples, and the loop-bar upon which the staples are formed, are all arranged in a row or series along the path of travel of the strip of paper, in the order mentioned, and whereby the several steps involved in the general operation of making and applying the tags are all performed in their proper order or sequence.

3. A machine for making and applying tags, comprising staple-forming-and-driving mechanism carried by a reciprocating head, printing devices carried by a second reciprocating head, a paper-knife carried by said stapling-head, paper-feeding mechanism actuated by said printing-head, automatic wire-feeding mechanism actuated by said stapling-head, and a manually operated power device and a pair of vertically reciprocating connecting rods connected and arranged for reciprocating both of said heads and operating all of said devices and mechanisms, the said stapling-head having a greater extent of movement than the printing-head, together with a hollow standard supporting the various operative parts and inclosing one of said rods, and the said machine as a whole comprising suitable connections and relative arrangement whereby the means for feeding the paper, the means for printing on the paper, the means for cutting the paper, the means for driving and clenching the staples, and the loop-bar upon which the staples are formed, are all arranged in a row or series along the path of travel of the strip of paper, in the order mentioned, and whereby the several steps involved in the general operation of making and applying the tags are all performed in their proper order or sequence.

4. A machine for making and applying tags, comprising devices for feeding and cutting the paper, means for automatically feeding the wire, a reciprocating head carrying staple-forming-and-driving mechanism, a second reciprocating head carrying printing devices, and a single foot-lever and a pair of vertically reciprocating rods adapted and connected for reciprocating both of said heads, and thereby operating said feeding devices, together with a hollow standard supporting said devices and inclosing one of said rods, the machine also comprising suitable connections and relative arrangement whereby the different steps involved in the general operation of making and applying the tags are performed in their proper order or sequence.

5. In a machine for making and applying tags, the combination of paper-feeding devices, printing devices, a paper-cutting device, stapling mechanism, a wire-feeding device, and a single foot-lever and a pair of vertically reciprocating rods connected and arranged for operating all of said instrumentalities, together with a hollow standard supporting said devices and inclosing one of said rods, the machine also comprising suitable connections and relative arrangement whereby the different steps involved in the general operation of making and applying the tags are performed in their proper order or sequence.

6. A machine for making and applying tags, comprising automatic paper-feeding mechanism, printing devices, wire-feeding devices, staple-forming-and-driving mechanism, a paper-cutting device, a movable clench-block, and a single foot-lever and a pair of vertically reciprocating connecting rods connected and arranged for both actuating said clench-block and operating all of said devices and mechanism, together with a hollow standard supporting said devices and inclosing one of said rods, the machine also comprising suitable connections and relative arrangement whereby the different steps involved in the general operation of making and applying the tags are performed in their proper order or sequence.

7. A machine for making and applying tags, comprising a stapling-head, a printing-head, automatic paper-feeding mechanism, wire-feeding mechanism, and a single foot-lever and a pair of vertically reciprocating connecting rods connected and arranged for reciprocating both of said heads and also operating all of said devices, the stapling-head having a greater extent of movement than the printing-head, together with a hollow standard supporting the various operative parts and inclosing one of said rods, the machine also comprising suitable connections and relative arrangement whereby the different steps involved in the general operation of making and applying the tags are performed in their proper order or sequence.

8. A machine for making and applying tags, comprising staple-forming-and-driving mechanism carried by a reciprocating head, printing devices carried by a second reciprocating head, a paper knife carried by said stapling-head, paper-feeding mechanism actuated by said printing-head, wire-feeding mechanism actuated by said stapling-head, and a manually operated power device and a pair of vertically reciprocating connecting rods connected and arranged for reciprocating both of said heads and operating all of said devices and mechanisms, the said stapling head having a greater extent of movement than the printing-head, together with a hollow standard supporting the various operative parts and inclosing one of said rods, the machine also comprising suitable connections and relative arrangement whereby the different steps involved in the general operation of making and applying the tags are performed in their proper order or sequence.

9. A machine for making and applying tags, comprising a reciprocating stapling-head, a printing-head, a single foot lever for reciprocating both of said heads, a rod or connection for connecting the printing-head with the foot-lever at a point near the latter's fulcrum, connection between the said stapling-head and said foot-lever, said latter connection engaging said foot-lever at a point farther away from said fulcrum, the stapling head thereby having a greater extent of movement than the printing-head, a feeding device for feeding the paper, a feeding device for feeding the wire, a cutting device for cutting the paper, and a clench-block.

10. A machine for making and applying tags, comprising a suitable standard, a rod or spindle extending downward through said standard, a head carried at the upper end of said rod or spindle, staple-forming-and-driving mechanism carried by said head, a printing-head supported for vertical reciprocation at the upper portion of said standard, a foot-lever having its end fulcrumed at the base of said standard, a rod connecting said printing head with said foot-lever at a point near the latter's fulcrum, the lower end of said rod or spindle carrying the stapling head being connected with the foot-lever at a point farther away from said fulcrum, the said stapling head thereby having a greater extent of movement than the said printing head, and means for feeding and cutting the paper.

11. A machine for making and applying tags, comprising automatic means for feeding a strip of material, means for cutting off a length of said material, having a knife edge movable to a point below the plane of the tag, means for feeding wire at right angles to the strip of material, means for cutting off the wire, means for bending the wire into a staple, means for raising an article into position to receive the tag, means for driving the staple through the said length of material and into the said article, and operating connections whereby the staple is inserted before the tag is cut off.

12. A machine for making and applying tags, comprising automatic means for feeding a strip of material, means for cutting off a length of said material, means for feeding wire at right angles to the strip of material, means for cutting off the wire, means for bending the wire into a staple, means for raising an article into position to receive the tag, means for driving the staple through the said length of material and into the said article, and connections whereby the staple is inserted before the tag is cut off, including a single lever for controlling all of said devices.

13. A machine for making and applying tags, comprising automatic means for feeding a strip of material, means for cutting off a length of said material, means for feeding wire at right angles to the strip of material, means for cutting off the wire, means for bending the wire into a staple, means for raising an article into position to receive the tag, means for driving the staple through the said length of material and into the said article, and connections whereby the staple is inserted before the tag is cut off, including a vertical rod provided at its upper end with a head having means for actuating the said wire feeding and cutting and staple forming and driving devices.

14. A machine for making and applying tags, comprising automatic means for feeding a strip of material, means for cutting off a length of said material, having a knife edge movable to a point below the plane of the tag, means for feeding wire at right angles to the strip of material, means for cutting off the wire, means for bending the wire into a staple, means for raising an article into position to receive the tag, means for driving the staple through the said length of material and into the said article, before the tag is cut off, the said means for cutting the material being disposed between the said staple forming and driving mechanism and the said means for feeding the material, said material and wire being carried on separate rolls, the axes of said rolls being at right angles to each other.

15. A machine for making and applying tags, comprising automatic means for feeding a strip of material, means for cutting off a length of said material, having a knife edge movable to a point below the plane of the tag, means for feeding wire at right angles to the strip of material, means for cutting off the wire, means for bending the wire into a staple, means for raising an article into position to receive the tag, means for driving the staple through the said length of material and into the said article, before the tag is cut off, the means for feeding the material consisting of a set of feed rolls having axes extending in one direction, and the means for feeding the wire consisting of a set of feed rolls having axes extending at right angles to said other direction.

16. A machine for making and applying tags, comprising automatic means for feeding a strip of material, means for cutting off a length of said material, means for feeding wire at right angles to the strip of material, means for cutting off the wire, means for bending the wire into a staple, means for raising an article into position to receive the tag, means for driving the staple through the said length of material and into the said article, and connections whereby the staple is inserted before the tag is cut off, including a vertically reciprocating rod, controlled by a single foot-lever, for operating all of said devices.

17. In a tag machine, mechanism for making the tag, mechanism for stapling the tag to an article, comprising a staple former and driver and a pivoted loop bar, said loop bar mounted to swing about a horizontal axis extending at right angles to the length of the tag, the driver being disposed between the loop bar and the mechanism for making the tag, and means for yieldingly raising the article into position to receive the tag and clenching the points of the staples.

18. A machine for making and attaching tags, comprising upper and lower stapler heads, a loop bar movably supported on the lower head, a staple former yieldingly connected with the upper head, arranged to coöperate with said loop bar, a staple driver carried by said upper head, disposed in position to drive the staple formed on said loop bar, a device for feeding wire to said loop bar, means for operating said device to feed the wire when the upper head moves downward, mechanism for feeding a strip below said staple driver, a cutter for severing the end portion of said strip, secured to the upper head, a support for holding the work in position to receive the staple and end portion of the strip, a table for supporting the strip between said mechanism and cutter, a slide on said lower head, means for operating said mechanism to feed the strip by the downward movement of said slide, printing means on said slide, disposed over said table, and connections for vertically reciprocating said slide and upper head.

19. A machine for making and attaching tags, comprising upper and lower stapler heads, a loop bar movably supported on the lower head, a staple former yieldingly connected with the upper head, arranged to coöperate with said loop bar, a staple driver carried by said upper head, disposed in position to drive the staple formed on said loop bar, a device for feeding wire to said loop bar, means for operating said device to feed the wire when the upper head moves downward, mechanism for feeding a strip below said staple driver, a cutter for severing the end portion of said strip, secured to the upper head, a support for holding the work in position to receive the staple and end portion of the strip, a table for supporting the strip between said mechanism and cutter, a slide on said lower head, means for operating said mechanism to feed the strip by the downward movement of said slide, printing means on said slide, disposed over said table, and connections for vertically reciprocating said slide and upper head, said loop bar having a pivoted axis extending parallel with the direction in which the wire is fed into position, but at right angles to the direction of feed of the strip, and secured to the upper head to operate said loop bar.

20. A machine for making and attaching tags, comprising upper and lower stapler heads, a loop bar movably supported on the lower head, a staple former yieldingly connected with the upper head, arranged to coöperate with said loop bar, a staple driver carried by said upper head, disposed in position to drive the staple formed on said loop bar, a device for feeding wire to said loop bar, means for operating said device to feed the wire when the upper head moves downward, mechanism for feeding a strip below said staple driver, a cutter for severing the end portion of said strip, secured to the upper head, a support for holding the work in position to receive the staple and end portion of the strip, a table for supporting the strip between said mechanism and cutter, a slide on said lower head, means for operating said mechanism to feed the strip by the downward movement of said slide, printing means on said slide, disposed over said table, and connections for vertically reciprocating said slide and upper head, the direction in which the wire is fed into position being at right angles to the direction of feed of the strip, and the said slide and upper head having downward movement at the same time but the slide having a shorter stroke than said head.

21. A machine for making and attaching tags, comprising upper and lower stapler heads, a loop bar movably supported on the lower head, a staple former yieldingly connected with the upper head, arranged to coöperate with said loop bar, a staple driver carried by said upper head, disposed in position to drive the staple formed on said loop bar, a device for feeding wire to said loop bar, means for operating said device to feed the wire when the upper head moves downward, mechanism for feeding a strip below said staple driver, a cutter for severing the end portion of said strip, secured to the upper head, a support for holding the work in position to receive the staple and end portion of the strip, a table for supporting the strip between said mechanism and cutter, a slide on said lower head, means for operating said mechanism to feed the strip by the downward movement of said slide, printing means on said slide, disposed over said table, and connections for vertically reciprocating said slide and upper head, an inking device pivoted on said slide, and means for causing said inking device to engage and disengage the printing means when the slide moves up and down.

22. A machine for making and attaching tags, comprising upper and lower stapler heads, a loop bar movably supported on the lower head, a staple former yieldingly connected with the upper head, arranged to coöperate with said loop bar, a staple driver carried by said upper head, disposed in position to drive the staple formed on said loop bar, a device for feeding wire to said loop bar, means for operating said device to feed the wire when the upper head moves downward, mechanism for feeding a strip below said staple driver, a cutter for severing the end portion of said strip, secured to the upper head, a support for holding the work in position to receive the staple and end portion of the strip, a table for supporting the strip between said mechanism and cutter, a slide on said lower head, means for operating said mechanism to feed the strip by the downward movement of said slide, printing means on said slide, disposed over said table, and connections for vertically reciprocating said slide and upper head, said cutter being disposed in such position relative to said staple driver that the end portion of the strip is severed after the staple is inserted through the same and into the work.

23. A machine for making and attaching tags, comprising upper and lower stapler heads, a loop bar movably supported on the lower head, a staple former yieldingly connected with the upper head, arranged to coöperate with said loop bar, a staple driver carried by said upper head, disposed in position to drive the staple formed on said loop bar, a device for feeding wire to said loop bar, means for operating said device to feed the wire when the upper head moves downward, mechanism for feeding a strip below said staple driver, a cutter for severing the end portion of said strip, secured to the upper head, a support for holding the work in position to receive the staple and end portion of the strip, a table for supporting the strip between said mechanism and cutter, a slide on said lower head, means for operating said mechanism to feed the strip by the downward movement of said slide, printing means on said slide, disposed over said table, and connections for vertically reciprocating said slide and upper head, said work support having a clench block for bending the points of the stapler, and for causing said support to move upward when the said slide and upper head move downward.

24. A machine for making and attaching tags, comprising upper and lower stapler heads, a loop bar movably supported on the lower head, a staple former yieldingly connected with the upper head, arranged to coöperate with said loop bar, a staple driver carried by said upper head, disposed in position to drive the staple formed on said loop bar, a device for feeding wire to said loop bar, means for operating said device to feed the wire when the upper head moves downward, mechanism for feeding a strip below said staple driver, a cutter for severing the end portion of said strip, secured to the upper head, a support for holding the work in position to receive the staple and end portion of the strip, a table for supporting the strip between said mechanism and cutter, a slide on said lower head, means for operating said mechanism to feed the strip by the downward movement of said slide, printing means on said slide, disposed over said table, and connections for vertically reciprocating said slide and upper head, said slide consisting of a plate disposed in a vertical plane, said lower head having dove-tail guides for the edges of said plate, said printing means being removably secured to the front of said plate between said guides, and the upper end of said plate having an arm provided with a pawl forming said means for operating said mechanism.

25. A machine for making and attaching tags, comprising upper and lower stapler heads, a loop bar movably supported on the lower head, a staple former yieldingly connected with the upper head, arranged to cooperate with said loop bar, a staple driver carried by said upper head, disposed in position to drive the staple formed on said loop bar, a device for feeding wire to said loop bar, means for operating said device to feed the wire when the upper head moves downward, mechanism for feeding a strip below said staple driver, a cutter for severing the end portion of said strip, secured to the upper head, a support for holding the work in position to receive the staple and end portion of the strip, a table for supporting the strip between said mechanism and cutter, a slide on said lower head, means for operating said mechanism to feed the strip by the downward movement of said slide, printing means on said slide, disposed over said table, and connections for vertically reciprocating said slide and upper head, said staple former and said driver being disposed between said cutter and loop bar, and means for operating said loop bar, fixed on said upper head.

Signed by me at St. Joseph, Berrien county, Michigan, this 14th day of December, 1901.

EDWARD CRAIG.

Witnesses:
 JOHN C. ST. CLAIR,
 W. H. RAY.